(12) United States Patent
Mavinakuli et al.

(10) Patent No.: US 9,817,841 B2
(45) Date of Patent: Nov. 14, 2017

(54) SCHEDULED SYNCHRONIZATION

(71) Applicants: Prasanna Bhat Mavinakuli, Sagar (IN); Tanushree Nandy, New Delhi (IN); Madhukar Samak, Bangalore (IN); Balasubramaniyan Krithivasan, Bangalore (IN)

(72) Inventors: Prasanna Bhat Mavinakuli, Sagar (IN); Tanushree Nandy, New Delhi (IN); Madhukar Samak, Bangalore (IN); Balasubramaniyan Krithivasan, Bangalore (IN)

(73) Assignee: SAP SE, Walldorf (DE)

( * ) Notice: Subject to any disclaimer, the term of this patent is extended or adjusted under 35 U.S.C. 154(b) by 325 days.

(21) Appl. No.: 14/579,816

(22) Filed: Dec. 22, 2014

(65) Prior Publication Data

US 2016/0179838 A1 Jun. 23, 2016

(51) Int. Cl.
*G06F 17/00* (2006.01)
*G06F 17/30* (2006.01)

(52) U.S. Cl.
CPC .. *G06F 17/30165* (2013.01); *G06F 17/30581* (2013.01)

(58) Field of Classification Search
CPC .............. G06F 17/30165; G06F 17/30581
USPC ........................................... 707/618
See application file for complete search history.

(56) References Cited

U.S. PATENT DOCUMENTS

| | | | | |
|---|---|---|---|---|
| 8,307,110 B1* | 11/2012 | Katzer | ............... | H04L 12/1859 709/219 |
| 8,725,965 B2* | 5/2014 | Hart | ................... | G06F 11/1461 711/1 |
| 9,239,846 B2* | 1/2016 | Besen | ............... | G06F 17/30215 |
| 9,529,818 B2* | 12/2016 | Catmull | ............ | G06F 17/30194 |
| 2005/0119910 A1* | 6/2005 | Schneider | .......... | G06Q 30/0601 709/203 |
| 2005/0119913 A1* | 6/2005 | Hornreich | .............. | G06Q 50/22 705/2 |
| 2005/0216439 A1* | 9/2005 | Kawakita | ............ | G06F 17/3089 |
| 2007/0027932 A1* | 2/2007 | Thibeault | ............ | G06F 17/3089 |

(Continued)

OTHER PUBLICATIONS

Jun, Seung, et al., "FeedEx: Collaborative Exchange of News Feeds", WWW 2006, Edinburgh, Scotland, May 23-26, 2006, pp. 113-122.*

(Continued)

*Primary Examiner* — Robert Stevens
(74) *Attorney, Agent, or Firm* — Klarquist Sparkman, LLP

(57) ABSTRACT

The described technologies can be used for scheduled synchronization of documents. In one example, a method of controlling synchronization according to a stored update schedule can comprise locally storing a document comprising one or more visualizations based on at least one or more datasets. The update schedule can be stored in association with the document. The update schedule can indicate a periodic interval for synchronizing the document. Login credentials for a remote server can be stored. An upload of the document to the remote server can be initiated without user interaction and according to the update schedule. Uploading can comprise logging into the remote server using the stored login credentials and transmitting the document to the remote server, whereby the locally stored document and the uploaded document are synchronized at periodic intervals.

19 Claims, 8 Drawing Sheets

(56) References Cited

U.S. PATENT DOCUMENTS

| | | | | |
|---|---|---|---|---|
| 2007/0038712 | A1* | 2/2007 | Affronti | G06Q 10/06 709/206 |
| 2007/0094389 | A1* | 4/2007 | Nussey | H04L 12/585 709/225 |
| 2007/0100836 | A1* | 5/2007 | Eichstaedt | G06F 17/3089 |
| 2008/0046369 | A1* | 2/2008 | Wood | G06F 21/31 705/50 |
| 2009/0228774 | A1* | 9/2009 | Matheny | G06F 17/30873 715/201 |
| 2009/0254589 | A1* | 10/2009 | Nair | G06F 17/30581 |
| 2012/0297450 | A1* | 11/2012 | Whittick | H04L 63/08 726/3 |
| 2014/0114912 | A1* | 4/2014 | Nair | G06F 17/2288 707/608 |

OTHER PUBLICATIONS

Liu, Hongzhou, et al., "Client Behavior and Feed Characteristics of RSS, a Publish-Subscribe System for Web Micronews", IMC '05 Proceedings of the 5th ACM SIGCOMM conference on Internet Measurement, Berkeley, CA, Oct. 19-21, 2005, pp. 29-34.*

Kong, Nicholas, et al., "VisualWikiCurator: Human and Machine Intelligence for Organizing Wiki Content", IUI 2011, Palo Alto, CA, Feb. 13-16, 2016, pp. 367-370.*

Lindoo, Ed, "Using Google Sites, Google Groups and Google Documents to Enhance Your Course", Journal of Computing Sciences in Colleges, vol. 25, Issue 2, Dec. 2009, pp. 46-51.*

Ardissono, L., et al., "SynCFr: Synchronization Collaboration Framework", ICIW 2009, Venice/Mestre, Italy, May 24-28, 2009, pp. 18-23.*

Marshall, Catherine C., et al., "Supporting Research Collaboration through Bi-Level File Synchronization", GROUP '12, Sanibel Island, FL, Oct. 27-31, 2012, pp. 165-174.*

Chiang, Johannes K., et al., "Authentication, Authorization and File Synchronization on Hybrid Cloud—On Case Of Google Docs, Hadoop, and Linux Local Hosts", ISBAST 2013, Chengdu, Sichuan, China, Jul. 2-5, 2013, pp. 116-123.*

Random House Webster's College Dictionary, Random House, Inc., New York, NY, © 2000, p. 925.*

Microsoft Computer Dictionary, 4th Edition, Microsoft Press, Redmond, WA, © 1999, p. 83.*

Lindholm, Tancred, et al., "Syxaw: Data Synchronization Middleware for the Mobile Web", Mobile Networks and Applications, vol. 14, Issue 5, Oct. 2009, pp. 661-676.*

"OneDrive" Wikipedia, the free encyclopedia, Nov. 19, 2014, 17 pages.

"Overview of Google Docs, Sheets, and Slides," Google, Nov. 12, 2014, 3 pages.

"RSS—Rich Site Summary," Wikipedia, the free encyclopedia, Nov. 12, 2014, 9 pages.

"SAP Lumira User Guide," SAP, Oct. 27, 2014, 140 pages.

* cited by examiner

SCHEDULED SYNCHRONIZATION

BACKGROUND

Cloud computing is the use of hardware and software computing resources which are available in a remote location and accessible over a network, such as the Internet. Users are able to lease or buy these computing resources to perform computations and to store their data. For example, data on a local client device can be copied to the remote cloud resources. Cloud resources can provide a number of advantages including cost advantages and/or the ability to adapt rapidly to changing computing resource needs. However, cloud resources may not always be accessible, such as when a user is working offline on a client device.

SUMMARY

This Summary is provided to introduce a selection of concepts in a simplified form that are further described below in the Detailed Description.

In one embodiment, a method of controlling synchronization according to a stored update schedule is disclosed. The method can be implemented at least in part by a computing system can include locally storing a document comprising one or more visualizations based on at least one or more datasets. The update schedule can be stored in association with the document. The update schedule can indicate a periodic interval for synchronizing the document. Login credentials can be stored for a remote server. An upload of the document to the remote server can be initiated according to the update schedule and without user interaction. The uploading can comprise logging into the remote server using the stored login credentials and transmitting the document to the remote server, whereby the locally stored document and the uploaded document are synchronized at periodic intervals.

In another embodiment, a system can include a storage system configured to store a document comprising one or more visualizations based on at least one or more datasets. The system can include an update schedule indicating a periodic interval for synchronizing the document. The system can include a scheduling component in communication with the storage system. The scheduling component can be configured to synchronize the document according to the update schedule. Synchronizing of the document can comprise logging into a remote server and transmitting the document to the remote server.

In another embodiment, one or more computer-readable storage media can comprise computer-executable instructions causing a computing system to perform a method. The method can comprise storing a document. The document can comprise a visualization based on one or more datasets. An update schedule can be stored in association with the document. The update schedule can indicate a periodic interval for synchronizing the document. Synchronizing the document can comprise refreshing the document. Login credentials can be stored for a remote server. An upload of the refreshed document to the remote server can be initiated without user interaction according to the update schedule. The uploading can comprise logging into the remote server using the stored login credentials and transmitting the refreshed document to the remote server.

The foregoing and other objects, features, and advantages of the invention will become more apparent from the following detailed description, which proceeds with reference to the accompanying figures.

DETAILED DESCRIPTION

Overview

Users across an organization may have data and documents that are stored on local client devices and/or on a remote server, such as at a cloud storage facility. There can be trade-offs between storing the data and documents at either the local client devices or at the remote server. For example, data and documents stored on the local client device, such as a desktop computer or a laptop computer, can be accessible even when the local client device is disconnected from the network. Thus, a user on a business trip or working from home can continue to work on documents and modify datasets stored locally, even if the client device does not have a network connection. Also, data and documents stored on the local client device can be private to the user of the client device. Thus, access to personal or confidential data may be more restricted when it is stored at a local client device and desired to be kept off of the cloud.

However, documents and data stored on a server may be accessible to a team of multiple members of the organization. For example, a cloud storage facility can be used as a central repository for documents and/or datasets created and/or collected by the team. Having documents accessible to the team may foster collaboration among the team and help the team to make better decisions.

As an example, users may analyze and transform collected data to create documents and reports that can be shared with other users of the organization. The documents to be shared can be created on a local client device and then manually uploaded to a server or a cloud storage facility. The documents may be created regularly, such as for a weekly or a monthly report. However, a user may forget or be unable to upload an updated or refreshed document to the cloud at the expected time, which can hinder collaboration with other users that may desire to access the document.

As described herein, a user can create an update schedule for the document. For example, the update schedule can indicate a periodic interval for uploading the refreshed document to the cloud. Thus, the document can be synchronized between a user's local client device and the cloud at a regular interval. Thus, a user can analyze data and revise the document in between the regular intervals, and the document can be automatically uploaded to the cloud without user interaction at the scheduled update time. By uploading the document, the user can share the document with other users. For example, the user can create and/or modify an access list associated with the document, where the access list includes a list of users authorized to access the document. When the document is uploaded to the cloud, the authorized users can be notified about the refreshed document, and the authorized users can potentially access the refreshed document.

Figure 1:
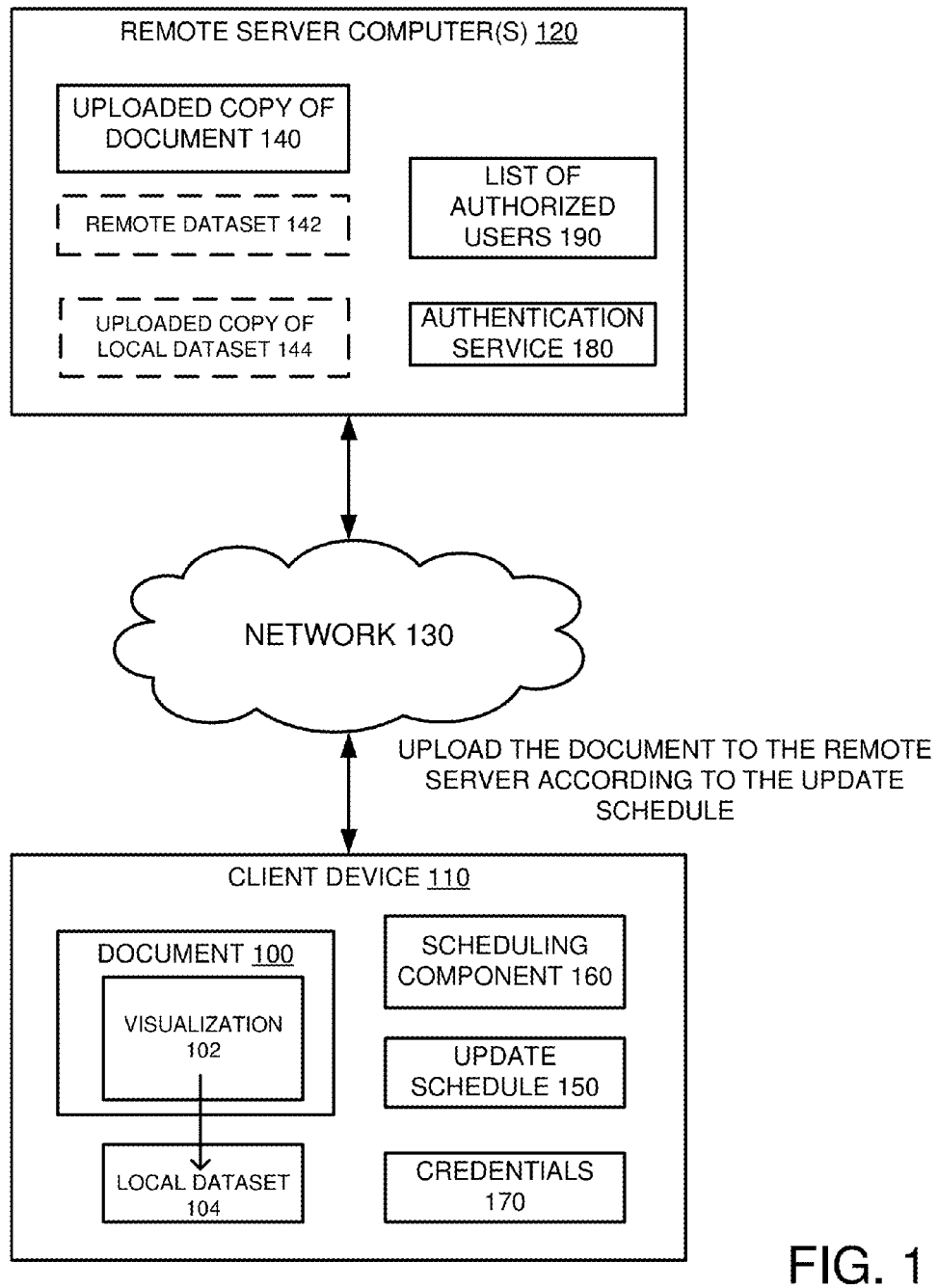
FIG. 1 is a block diagram of an example system implementing scheduled synchronization.

Example System Implementing Scheduled Synchronization Between a Remote Server Computer and a Client Device FIG. 1 is a block diagram of an example computing system implementing scheduled synchronization of a document 100 between a client device 110 and a remote server computer 120. The client device 110 and the remote server computer 120 can communicate via a network 130. The remote server computer 120 can be part of a datacenter of a cloud service provider. The cloud service provider can deliver computing and storage capacity as a service to a community of end recipients from a remote location. The cloud service provider can offer a "private cloud environment," where only one organization has access to the cloud, or the cloud service provider can offer a "public cloud environment" or "multi-tenant environment," where a plurality of customers can operate independently of each other. End users can access the cloud service provider using networked client devices, such as the client device 110. Those skilled in the art will recognize that the cloud service provider can be described as a "cloud" environment.

The network 130 can include a local area network (LAN), a Wide Area Network (WAN), the Internet, an intranet, a wired network, a wireless network, a cellular network, combinations thereof, or any network suitable for providing a channel for communication between the remote server computer 120 and the client device 110. It should be appreciated that the network topology illustrated in FIG. 1 has been simplified and that multiple networks and networking devices can be utilized to interconnect the various computing systems disclosed herein.

The client device 110 can include various types of clients, such as desktop computers, laptops, tablets, and smartphones running a browser and/or a client application for synchronizing the document 100 between the client device 110 and the remote server computer 120. For example, the client application can be part of a business intelligence software suite for enabling analysts and decision makers to access, transform, and visualize data. The application can be used to prepare data from multiple sources, visualize it, and then compose the document 100 from those visualizations, such as a visualization 102 which is based on a local dataset 104. The document 100 can be shared with other decision makers by uploading or transmitting the document 100 to the remote server computer 120. The remote server computer 120 can store an uploaded copy of the document 140. The application and/or a browser can be used to retrieve shared documents to further analyze data and collaborate with colleagues on datasets, stories, visualizations, and other business intelligence artifacts.

The locally stored document 100 can be the master or authoritative version of the document and the uploaded copy of the document 140 can be a snapshot of the document taken according to the update schedule 150. The update schedule 150 can include a time of day to update the document 100, and a periodic time interval for synchronizing the document 100, such as daily, weekly, monthly, or the like. It may be desirable to upload the document 100 at regular intervals, rather than storing the most up-to-date version of the document 100 at the remote server computer 120, so that other decision makers receive periodic updates of the information in the document 100 without seeing intermediate states of the document 100. For example, during the time between the update times, the document 100 can be in transition as the user analyzes data and composes new visualizations or modifies or deletes old visualizations of the document 100. As the update time approaches, the user can fine-tune and polish the document 100 for wider consumption. Thus, the other decision makers can see a polished document 100 updated at regular intervals without seeing the document 100 in an unfinished and intermediate state, such as if the master document was stored at the remote server computer 120.

The document 100 can include one or more visualizations based at least on one or more datasets. A visualization, such as visualization 102, can be an image, diagram, chart, table, graph, map, animation, or other visual aid created from a dataset. The visualization 102, thus depends on the dataset.

The visualization 102 can be used to transform, simplify, and/or condense the data to potentially show higher order structure or relationships of the data in the dataset. Thus, the visualization can potentially enable a user to explore, analyze, and understand the dataset more efficiently than without the visualization. For example, the data can represent physical structures or processes, such as when the data includes sample points of a measurement (such as weather data or medical imaging data) or modelling data. As another example, the data can show behavioral data such as test scores, sales data, television viewership, or voting participation. Examples of visualizations can include charts (such as pie charts, waterfall charts, geographic bubble charts, donut charts, radar charts, scatter plots, bar graphs, and stacked bar graphs), timelines, histograms, and heat maps. Changes in a dataset can thus result in corresponding changes in the associated visualization.

The authoritative versions of the datasets can be stored locally on the client device 110, such as local dataset 104, or remotely, such as remote dataset 142. The local dataset 104 can include experimental data that is collected and/or calculated locally by the client device 110, such as by one or more sensors of the client device 110. The local dataset 104 can include sensitive or confidential data that a user of the client device 110 does not want to store at the remote server computer 120. For example, the user of the client device 110 may have security concerns with storing and/or transmitting data to the remote server computer 120. The user of the client device 110 may not want to share the local dataset 104 with all members of the team that can access the document 100 due to privacy or proprietary concerns. For example, the local dataset 104 can include patient records or customer data. Alternatively, the local dataset 104 can be shareable, such as when it is desired to share the dataset with other users. When the local dataset 104 is shareable, it can be uploaded to the remote server computer 120 so that other users can potentially analyze a snapshot of the local dataset 104 taken at the upload time.

The remote dataset 142 can be uploaded to the remote server computer 120 by another user or calculated or collected by the remote server computer 120. For example, the remote dataset 142 can include data collected by scraping the Internet for information or operational data related to the remote server computer 120.

The datasets can be selectively copied from the client device 110 to the remote server computer 120 and from the remote server 120 to the client device 110. For example, the local dataset 104 can be uploaded to the remote server 120 and stored as the uploaded copy of the local dataset 144, such as when the local dataset 104 is shareable. Alternatively, the local dataset 104 can be stored only on the client device 110, such as when the local dataset 104 is private and contains confidential information and/or when the local dataset 104 is large and could potentially consume excessive bandwidth if the local dataset 104 were uploaded to the remote server computer 120. If the local dataset 104 is uploaded, it can be uploaded according to the update schedule 150 and without user interaction. Similarly, the remote dataset 142 can be selectively downloaded to the local client device 110 according to the update schedule 150 and without user interaction.

Uploading the document and/or datasets "without user interaction" can include performing most or all tasks of the uploading programmatically without a user initiating the process. For example, a background process can be started to monitor the current time and to determine if the current time matches a time to upload the document. When the current time matches the scheduled upload time, the background process can automatically cause the document to be uploaded. Alternatively, the user can be prompted to confirm that an upload can occur when the current time matches the scheduled upload time, and the upload can complete after confirmation is received from the user. Thus, in either alternative, the background process initiates the upload of the document and/or datasets. The background process can be executing even when a client application for accessing and creating documents is not executing, such as when the user is asleep or not working.

The uploaded copy of the local dataset 144, the remote dataset 142, and the uploaded copy of the document 140 can be stored encrypted or unencrypted in memory, a storage device, or a combination of the two. The tangible memory can be volatile memory (e.g., registers, cache, RAM), non-volatile memory (e.g., ROM, EEPROM, flash memory, etc.), or some combination of the two, accessible by the remote server computer 120. The storage can be removable or non-removable, such as magnetic disks, direct-attached storage, network-attached storage (NAS), storage area networks (SAN), redundant arrays of independent disks (RAID), magnetic tapes or cassettes, CD-ROMs, DVDs, or any other medium which can be used to store information in a non-transitory way and which can be accessed by the remote server computer 120.

The client device 110 can include a scheduling component 160 for determining whether it is time to synchronize the local version of the document 100 with the uploaded copy of the document 140 stored on the remote server computer 120. Synchronizing the document can include uploading the document 100 to the remote server computer 120. For example, the scheduling component 160 can compare the current day of the week, date, and time to the time and interval specified in the update schedule 150 for updating the document 100. If the current time matches the time and interval specified in the update schedule 150, the document 100 can be uploaded to the remote server computer 120. As a specific example, a current date and time of Monday, January 1 at 6:00 a.m., can match a daily scheduled update for 6:00 a.m., a weekly scheduled update for Mondays at 6:00 a.m., and a monthly scheduled update for the first of each month at 6:00 a.m. The scheduling component 160 can execute as part of the client application for preparing data, visualizations, and documents on the client device 110, or the scheduling component 160 can run as a background process or daemon so that the document 100 can be uploaded even if the client application is not currently executing. For example, the scheduling component 160 can be started as a daemon executing on the client device 110 when the update schedule 150 is created or modified.

The scheduling component 160 can perform various tasks as part of the update procedure. For example, the scheduling component 160 can login to the remote server computer 120 to open a communication session between the remote server computer 120 and the client device 110. The remote server computer 120 can be logged into using locally stored credentials 170. The credentials 170 can include a user-name password pair and/or a registration code, for example. The credentials 170 can be transmitted to the remote server computer 120 with a request to open a communication session. An authentication service 180 can authenticate the credentials 170 when the credentials 170 match credentials of an authorized user of the remote server computer 120. When the credentials are authenticated, the communication session can be opened and the document 100 and/or datasets can be refreshed and/or uploaded. As one example, the scheduling component 160 can transmit a copy of the document 100 from the client device 100 to the remote server computer 120, so that the copy of the document 100 can be stored as the uploaded copy of the document 140. A copy of the local dataset 104 may also be transmitted from the client device 100 to the remote server computer 120, so that the copy of the local dataset 104 can be stored as the uploaded copy of the local dataset 144. As another example, the document 100 can be refreshed prior to uploading to the remote server computer 120. Refreshing the document 100 can include downloading the remote dataset 142, and updating any visualizations based on the remote dataset 142 that are part of the document 100. Because the scheduling 160 component can perform such tasks according to a stored update schedule 150, more reliable performance of the tasks can result.

A list of authorized users 190 can be stored at the remote server computer 120 or at the client device 110. The list of authorized users 190 can provide a list of users that are authorized to access and/or modify the uploaded copy of the document 140. As one example, one user can have permission to write to the uploaded copy of the document 140 and one or more users can have permission to read the uploaded copy of the document 140. Respective users of the list of authorized users 190 can be notified when the document 100 is uploaded to the remote server computer 120 so that the users can access the latest version of the uploaded copy of the document 140. The notification can be by email or short message service (SMS) message, for example. As another example, multiple users can have permission to store or write the uploaded copy of the document 140, and the remote server computer 120 can manage storing multiple versions and/or merging different versions of the uploaded copy of the document 140. For example, different users may contribute different portions to the uploaded copy of the document 140, and the remote server computer 120 can merge the changes from the different users. User programmable rules can be defined to manage the conflicts. For example, a rule can be defined to always accept a supervisor's changes if there is a conflict. The remote server computer 120 can record the upload history to the remote server computer 120.

The document 100, local dataset 104, update schedule 150, credentials 170, and the list of authorized users 190 can be stored encrypted or unencrypted in memory, a storage device, or a combination of the two. The tangible memory can be volatile memory (e.g., registers, cache, RAM), non-volatile memory (e.g., ROM, EEPROM, flash memory, etc.), or some combination of the two, accessible by the client device 110. The storage can be removable or non-removable, such as magnetic disks, direct-attached storage, magnetic tapes or cassettes, CD-ROMs, DVDs, or any other medium which can be used to store information in a non-transitory way and which can be accessed by the client device 110.

Example Document

Figure 2:
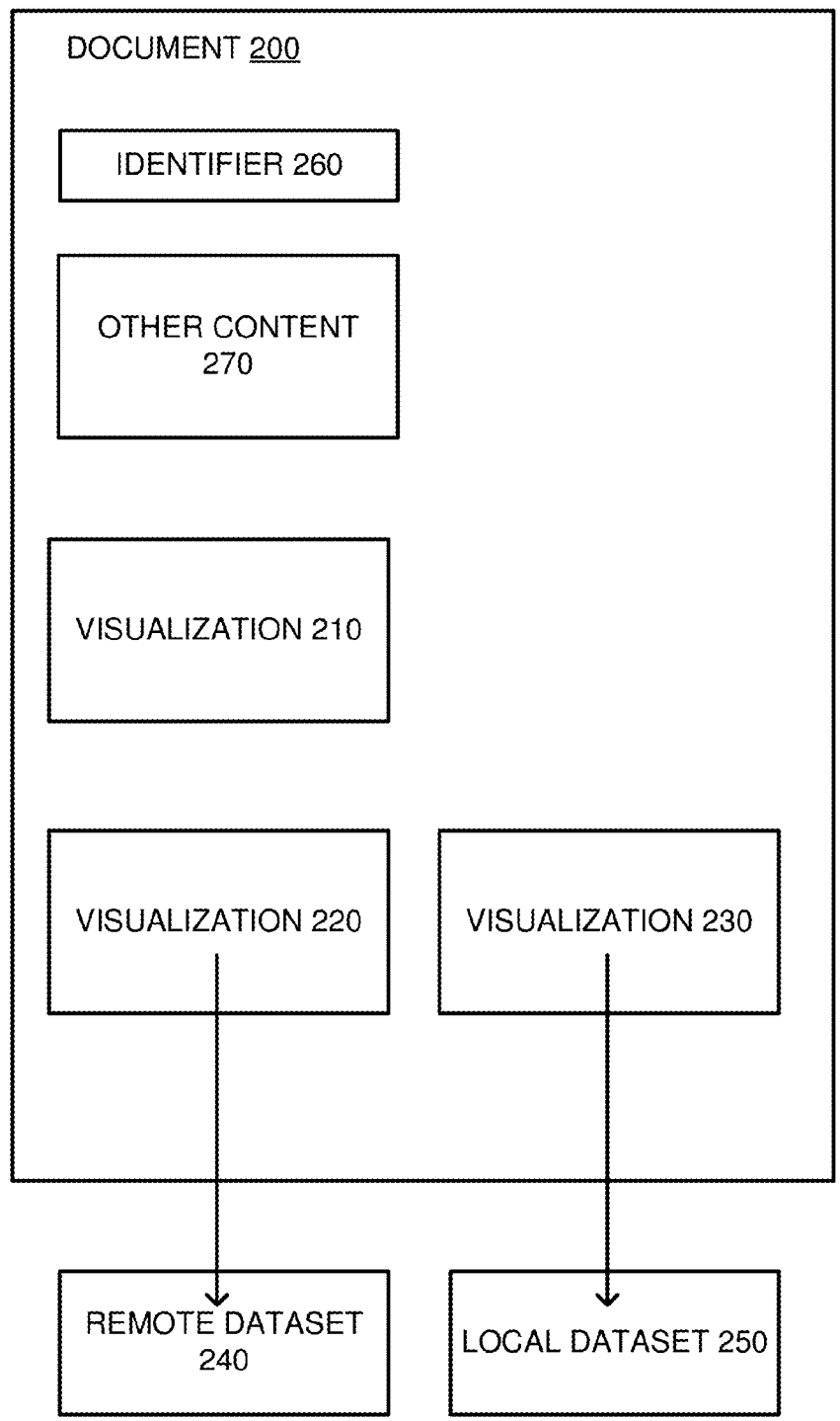
FIG. 2 is a block diagram of an example document comprising one or more visualizations based on one or more datasets.

FIG. 2 is a block diagram of an example document 200 comprising one or more visualizations (210, 220, 230) based on one or more datasets (240, 250). The document 200 can be edited and stored on a local client device, such as the client device 110, and uploaded to a remote server, such as the remote server 120, according to an update schedule and without user interaction. The document 200 can include an identifier 260 for referencing and distinguishing the document 200 from other documents. For example, the identifier 260 can be a filename including a base name, a hostname, a device, a directory path, a file type, a file version, and/or a user name.

The document 200 can include a visualization 230 based on a local dataset 250 that is maintained at the client device. The authoritative version of the local dataset 250 is on the local client device, but a snapshot of the local dataset 250 can be uploaded or copied to the remote server manually or according to the update schedule. By copying the local dataset 250 to the remote server, other users can access and analyze the snapshot of the local dataset 250. Alternatively, the local dataset 250 can be stored only on the local client device. For example, the local dataset 250 can be very large and so keeping the local dataset 250 only on the client device can reduce the bandwidth requirements of the client device. As another example, the local dataset 250 can be confidential, and maintaining the local dataset 250 only on the client device can potentially increase the security of the local dataset 250 by reducing access to the local dataset 250. The local dataset 250 can remain confidential even though the document 200 and the visualization 230 are shared among multiple users (such as when the document 200 is uploaded to the remote server) because the visualization 230 can show non-confidential aspects of the local dataset, such as trends and averages, or the confidential aspects of the local dataset can be redacted (such as by removing patient names) in the visualization 230. The visualization 230 can be updated or refreshed each time the local dataset 250 changes.

The document 200 can include a visualization 220 based on a remote dataset 240 that is accessible by the client device. The authoritative version of the remote dataset 240 can be on the remote server or on a client device of another user. For example, another user can maintain the remote dataset 240 and upload the remote dataset 240 to the remote server for sharing with other users. The remote dataset 240 can be accessed by the client device for generating the visualization 220. For example, the remote dataset 240 can be downloaded or copied to the local client device manually or according to the update schedule, and the visualization 220 can be generated or refreshed from the copy of the remote dataset 240. Alternatively, the visualization 220 can be generated or refreshed without copying the remote dataset 240 from the remote server. For example, the visualization 220 can be generated by querying the remote server for select information from the remote dataset 240. The visualization 220 can be updated or refreshed each time the remote dataset 240 is accessed.

The document 200 can include a visualization 210 based on a dataset that is not accessible by the client device. For example, the visualization 210 can be copied from another document and pasted into the document 200 without the ability to refresh the visualization 210 if the underlying data changes. In other words, the document 200 can include a visualization 210 based on a single snapshot of a dataset, such that the visualization 210 will not be refreshed even if the underlying data of the visualization 210 changes. As another example, the visualization 210 can be a link to a visualization of another document, and the visualization 210 can be updated when an updated source document is accessible by the client device.

The document 200 can include other content 270 that is not a visualization based on a dataset. For example, the other content 270 can include text, graphics, sounds, or other multimedia content that are not based on a locally or remotely stored dataset.

Example Method for Creating a Document and an Update Schedule

Figure 3:
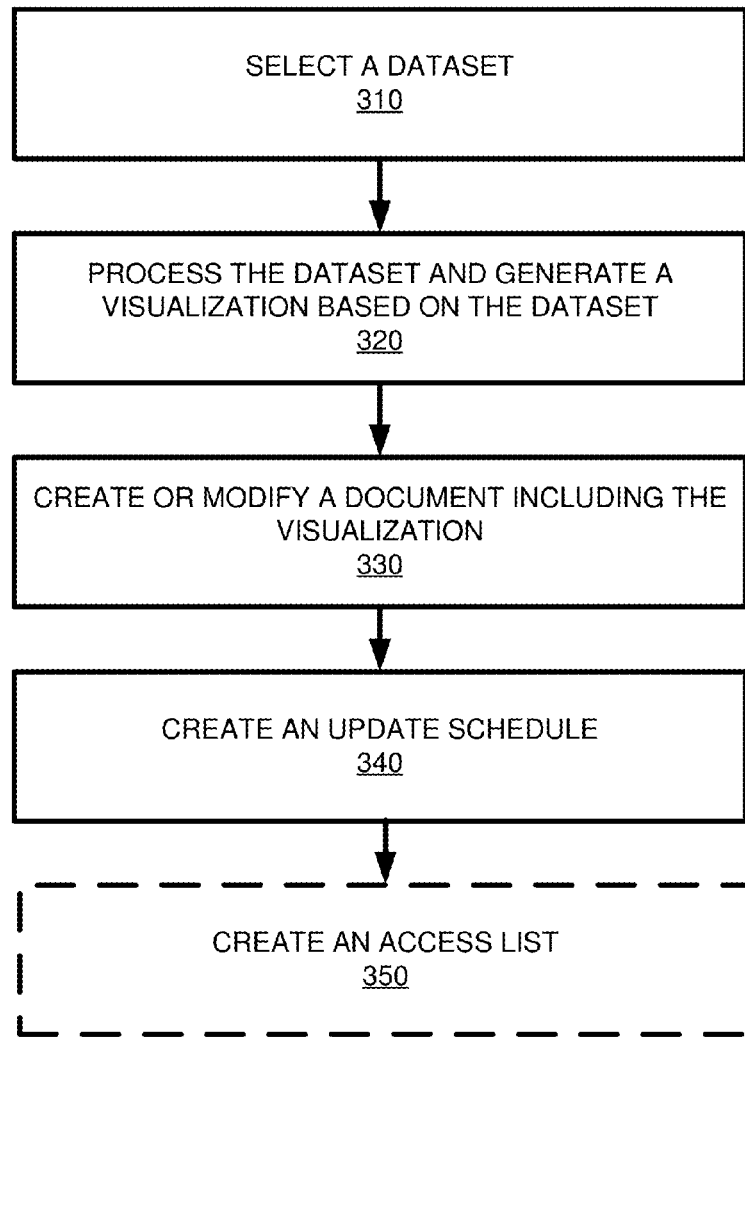
FIG. 3 is a flowchart of an example method for creating a document and an update schedule.

FIG. 3 is a flowchart of an example method 300 for creating a document (such as the documents 100 and 200) and an update schedule (such as the update schedule 150). At 310, a dataset can be selected. The data source for the dataset can include an existing dataset (local or remote), clipboard data from the operating system, a spreadsheet, a text file, a database, a database query, a script, or other source for generating multiple data values for the dataset. The dataset can be stored in a file on the client device or maintained in main memory for further processing.

At 320, the dataset can be processed to generate a visualization based on the dataset. Front-end processing can include: removing columns, dimensions, measures, and variables in the dataset; editing and cleaning data (such as sorting, filtering, and normalizing); reformatting or converting data to a different type; creating a geography or time hierarchy; creating a value of measure from a column or dimension (such as summing, averaging, calculating a minimum, maximum, or other value based on a user-defined formula); and adding and/or merging a dataset (e.g., creating one dataset from multiple datasets). Back-end processing can include: selecting a type of visualization (such as a comparison, percentage, correlation, trend, or geographical chart); selecting data from the dataset for the visualization (e.g., choosing measures and dimensions for a chart axis); and generating the visualization based on the selected data and visualization type. Comparison charts can include a vertical bar chart, a horizontal bar chart, a stacked column or bar chart, a bar chart with two X or Y axes, a three-dimensional column chart, a radar chart, a tag cloud chart, a funnel chart, and a table. Percentage charts can include a pie chart, a donut chart, a pie with depth chart, and a tree-map. Correlation charts can include a scatter plot, a bubble chart, a scatter matrix chart, a box plot chart, a network chart, a parallel coordinate chart, a tag cloud chart, and a numeric point chart. Trend charts can include a line chart, an area chart, a line chart with two Y axes, a combined column chart with two Y axes, a waterfall chart, and a heat-map. Geographical charts can include a geographic bubble chart, a geographic choropleth chart, and a geographic pie chart.

At 330, a document (such as documents 100 and 200) can be created or modified. The document can include one or more visualizations based on one or more datasets. Modifying the document can include adding new visualizations, removing or modifying existing visualizations, adding or removing additional content, and/or refreshing visualizations based on one or more changing datasets. The document is stored locally on the client device 110 when it is created and/or modified, and the locally stored document is the authoritative version of the document. The document can be stored in association with other information and/or files, such as an update schedule and an access list.

At 340, an update schedule (such as update schedule 150) can be created. The update schedule can indicate a periodic interval for synchronizing the document. Synchronizing the document can include refreshing and uploading the document. For example, the update schedule can include a time of day to update the document, and the periodic interval for updating the document can be daily, weekly, bi-weekly, monthly, annually, or other suitable time period. Once created, the update schedule can be modified and/or deleted. The update schedule can be stored where the scheduling component 160 can access the update schedule, such as on the local client device and/or a remote server or cloud storage facility.

At 350, an access list (such as the list of authorized users 190) associated with the document can be created. The access list can indicate that different users have different levels of access to the document. For example, a first user can have read-only permission for the document. A second user can have read-only permission for the document, where the read-only permission expires at a pre-defined time. A third user can have read/write privileges for the document, such as when multiple users share ownership of the document. For shared documents, the remote server can manage merging of the uploaded documents. The access list can include contact information for the users of the access list so that the users can be notified when the document is uploaded to the remote server. The contact information can include an email address, a network address (such as an Internet Protocol (IP) address), or a telephone number where an email or SMS message can be sent. The access list can be stored on the local client device and/or a remote server or cloud storage facility.

Example Screen for Creating an Update Schedule for a Document

Figure 4:
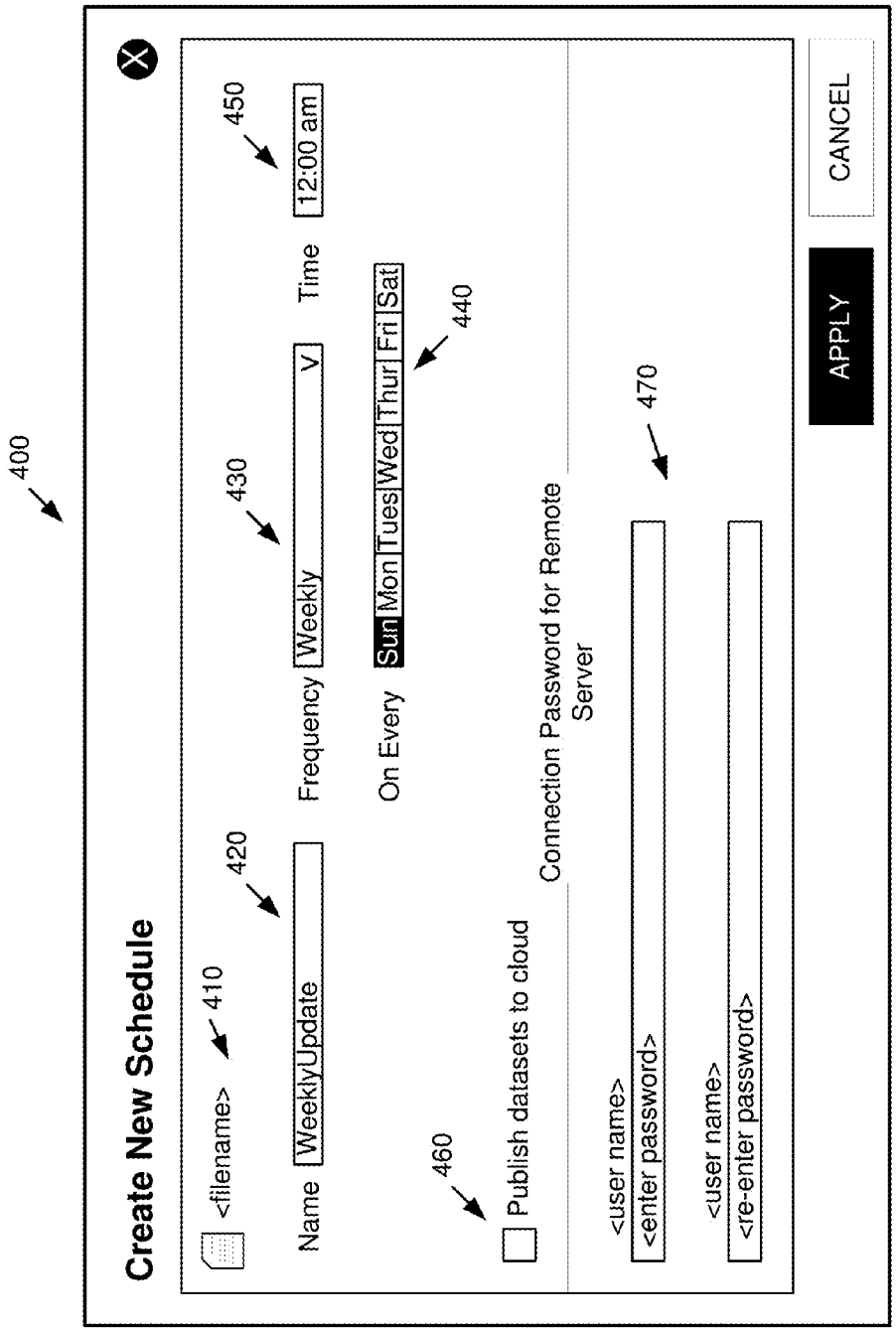
FIG. 4 is an example of a screen for creating a new update schedule.

FIG. 4 is an example of a screen 400 for a user to create or edit an update schedule for a document. For example, the screen can be displayed on a display screen of the client device 110 when a user of the client device 110 selects "create an update schedule" from a listing of the documents stored on the client device 110. The "<filename>" 410 can be an identifier (such as identifier 260) or part of an identifier for the document. The update schedule can include an identifier that is completely or partially entered at field 420. The identifier can be entered by the user or can be fully or partially automatically generated based on the document identifier. For example, the update schedule identifier can be "WeeklyUpdate," "<filename>_ WeeklyUpdate," or another suitable name.

A periodic interval for updating the document can be selected from a drop-down or other type of menu 430. As shown, the selected update period is weekly, but the period can be daily, weekly, bi-weekly, monthly, annually, or another suitable time period. Sub-menus such as menu 440 can be presented based on the selection from the menu 430. As shown, different days of the week can be selected for a weekly update period. Similarly, a sub-menu for selecting a particular day of the month can be shown for a monthly update period. For example, a particular day can be selected (such as the first or the twentieth) or a relative day of the month (such as the first Monday) can be selected. Other sub-menus can be displayed that are suitable for the corresponding selected refresh period. A time for updating the document can be entered at field 450.

The one or more datasets associated with the document can be selectively uploaded along with the document to the remote server. As shown, a single checkbox 460 can be used to select whether to upload all of the local datasets associated with a document. For example, if the checkbox 460 is selected, all of the local datasets will be uploaded with the document, but if the checkbox 460 is not selected, none of the local datasets will be uploaded with the document. Alternatively, a separate checkbox can be provided for respective local datasets used for the visualizations of the document. Thus, a portion of the local datasets can be uploaded and another portion of the local datasets can remain only on the client device.

The screen 400 can include one or more fields 470 for entering credentials for accessing the remote server. For example, the credentials can include a user name and/or password for the remote server. As shown, the user name has been detected and displayed over prompts to enter and re-enter the corresponding password. The credentials can be stored encrypted along with or separately from the update schedule.

Example Method for Synchronizing a Document

Figure 5:
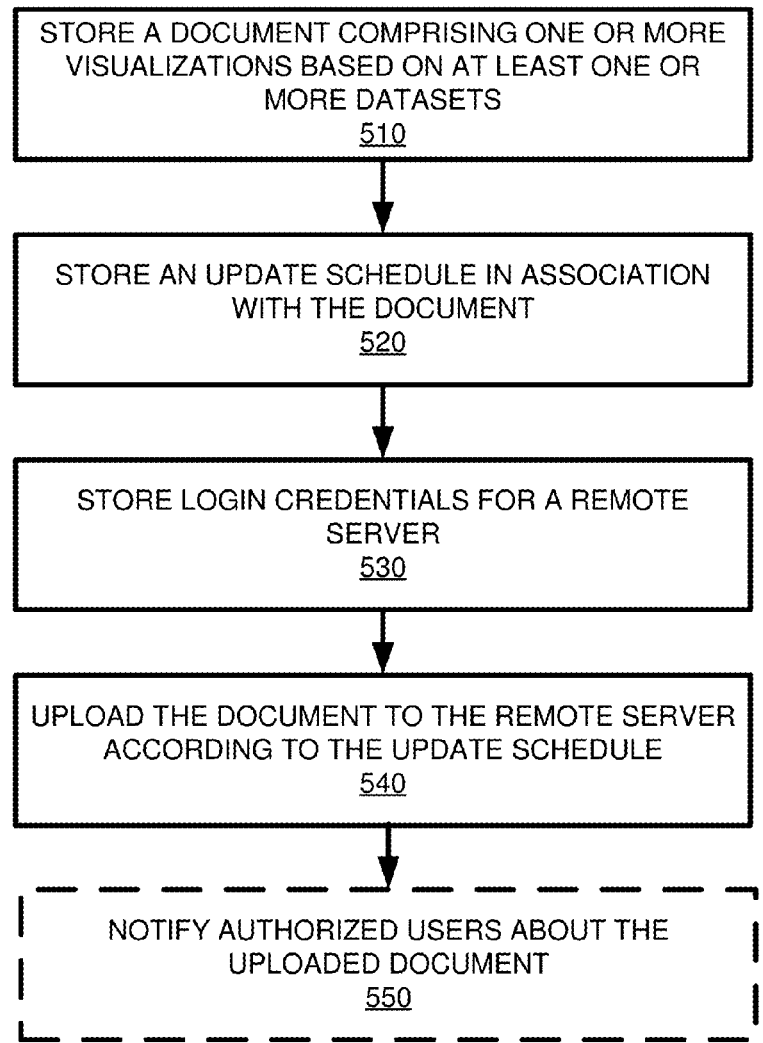
FIG. 5 is a flowchart of an example method for synchronizing a document according to an update schedule.

FIG. 5 is a flowchart of an example method 500 for synchronizing a document. For example, the document can be synchronized between a remote server computer and a client device according to an update schedule. At 510, a document can be stored at a local client device. The document can include one or more visualizations based on at least one or more datasets. The datasets can be stored locally and/or remotely.

At 520, an update schedule can be stored in association with the document. The update schedule can be stored locally and/or remotely. The update schedule can include a periodic interval for updating the document. The periodic interval can be daily, monthly, weekly, bi-weekly, or annually, for example. The update schedule can include a specific time of day for updating the document.

At 530, log-in credentials for a remote server can be stored. The log-in credentials can be stored locally and can be used to establish a communication session with the remote server. The log-in credentials can be stored encrypted or unencrypted, but system security can potentially be improved by encrypting the log-in credentials. The log-in credentials can include a user-name password pair, and/or a registration key, for example.

At 540, the document can be uploaded to the remote server according to the update schedule. The document can be uploaded without user interaction. For example, a background process running on the client device can determine that it is time to upload the document when the current time matches the time specified in the update schedule. The background process can be executing even when a client application for accessing and creating documents is not executing. At the upload time, the background process can perform additional operations (as will be described with reference to FIG. 7) and upload the document when a network connection is available between the client device and the remote server. If there is no network connection available at the scheduled time, an upload can be scheduled for the next time that a network connection is available.

At 550, authorized users of the document can be notified about the uploaded document. For example, the authorized users of the document can be provided in a list stored on the client device or the remote device. The client device or the remote device can send an email or a text message to the respective users in the list when the document is uploaded.

Another Example Method for Synchronizing a Document

Figure 6:
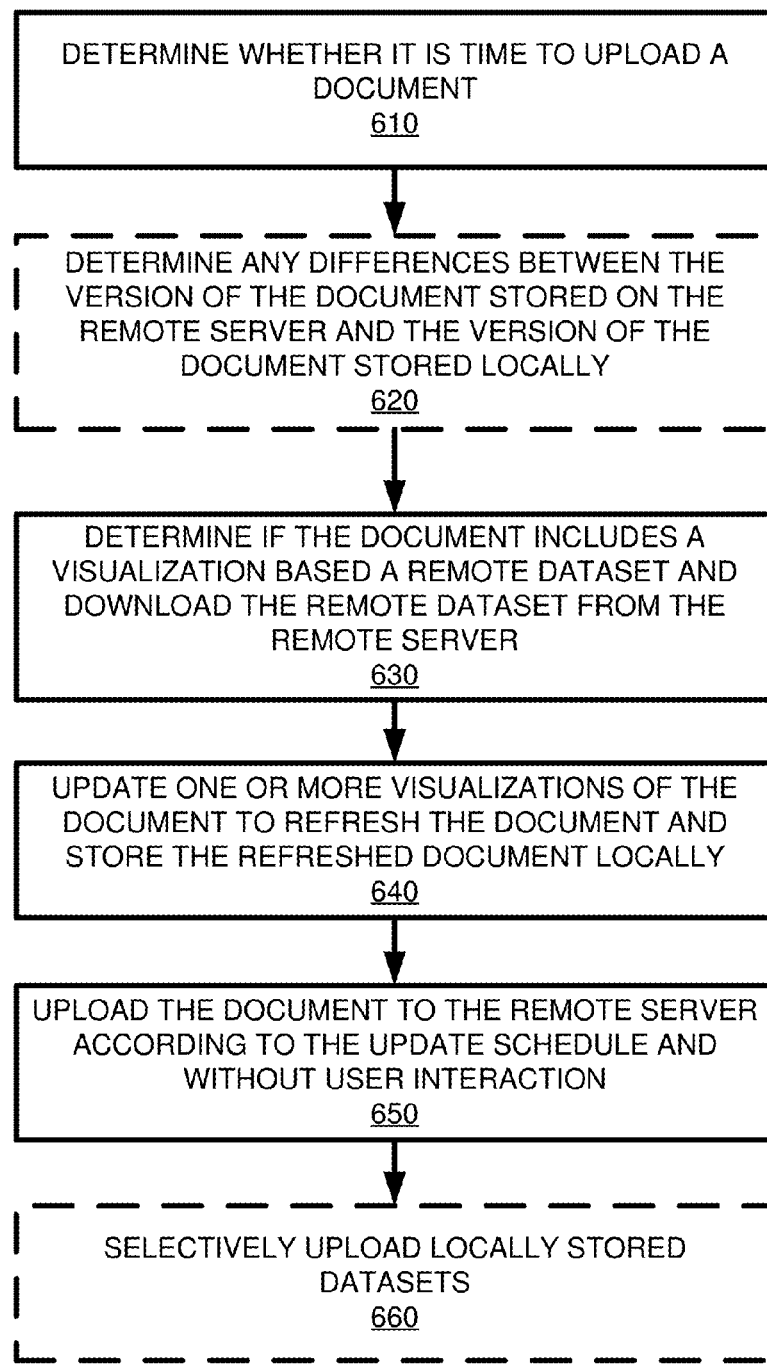
FIG. 6 is a flowchart of another example method for synchronizing a document.

FIG. 6 is a flowchart of an example method for synchronizing a document between a local client device and a remote server. Synchronizing the document can include refreshing and uploading the document. At 610, it can be determined if it is time to upload the document. For example, the date and time specified in the update schedule can be compared to the current date and time, and if the current date and time matches the scheduled date and time, an upload can be scheduled along with additional synchronization-related operations. The additional synchronization-related operations can include creating version and/or historical information, downloading remote datasets, refreshing the document with the latest information from the datasets, selectively uploading local datasets, and notifying authorized users of the document that the document has been uploaded. The synchronization-related operations can be triggered according to the update schedule and can occur before and/or after the document is uploaded to the remote server.

At 620, it can be determined if there are any differences between the version of the document stored on the remote server and the version of the document stored locally. For example, the document can be shared among multiple users and respective users can author different parts of the document. Differences between the local and remotely stored versions of the documents can be recorded so that a manual or automatic merge of the documents can occur. For example, rules can be defined for changes from one user to take precedence over the changes of another user for a portion of or for the entire document. The rules can be used to automatically merge changes of the document stored at the local client device with the document stored at the remote server. For example, changes at the remotely stored document can be downloaded to the locally stored document so that the documents can be consistent at a snapshot in time. In one embodiment, the user of the local client device can be notified of potential changes to the locally stored document, and the user can determine whether the locally stored document will be updated with the changes.

At 630, it can be determined if the document includes any visualizations based on a remote dataset, and if so, the remote dataset can be downloaded from the remote server. The remote dataset can be stored locally, such as in long-term storage on a hard-disk drive or other non-volatile storage, so that the client device can access information from the remote dataset even if the client device is off-line (e.g., the client device is not currently connected to a network). Alternatively, the remote dataset can be stored temporarily, such as for updating a visualization (640) based on the remote dataset. By only storing the remote dataset temporarily, using stale (e.g., out-of-date) data of a remote dataset can be avoided and storage requirements of the local client can potentially be reduced. As another alternative, the remote dataset can be accessed so that any visualizations based on the remote dataset can be refreshed. For example, queries can be sent to a remote server for information based on the remote dataset. Thus, any visualizations based on the remote dataset may be refreshed without downloading the entire remote dataset, reducing the bandwidth consumed by the client device.

At 640, the document can be refreshed by updating one or more visualizations of the document. For example, a visualization based on a remote dataset can be updated after the remote dataset is downloaded (630). As another example, a visualization based on a local dataset can be updated based on the current version of the local dataset. In one embodiment, it can be determined if any of the datasets have changed since the last time the document was stored and the document can be selectively refreshed depending on whether any of the datasets used to create visualizations of the document have changed. For example, timestamps associated with the datasets can be compared to a timestamp associated with the document, and if the timestamps of the datasets are more recent than the timestamps of the document, the document can be refreshed. However, if the timestamp of the document is more recent than the timestamps of the datasets, the document does not need refreshing. Thus, the visualizations of the document may potentially be recalculated only when the underlying data has changed. The document with any updated visualizations can be stored locally, prior to uploading the document. Thus, the locally stored document can be refreshed based on a snapshot of the datasets at the upload time.

At 650, the document can be uploaded to the remote server according to the update schedule and without user interaction. For example, the document can be uploaded after one or more visualizations of the document have been refreshed (such as at 640). As another example, the document can be uploaded after being merged with any changes that were detected at the remotely stored document (such as at 620).

At 660, the locally stored datasets associated with the document can be selectively uploaded to the remote server. For example, the document can include one or more visualizations based on one or more local datasets, and the upload schedule can include a parameter for determining whether respective local datasets are to be uploaded with the document. For example, the parameter can indicate if the local dataset should remain private to the local client. If the parameter is false, the local dataset is shareable and can be uploaded, and if the parameter is true, the local dataset can remain private to the client device and not be uploaded. Thus, access to the local dataset is more strictly controlled while allowing wider and more reliable access to a visualization dependent on such a local dataset.

Example Computing Environment

Figure 7:
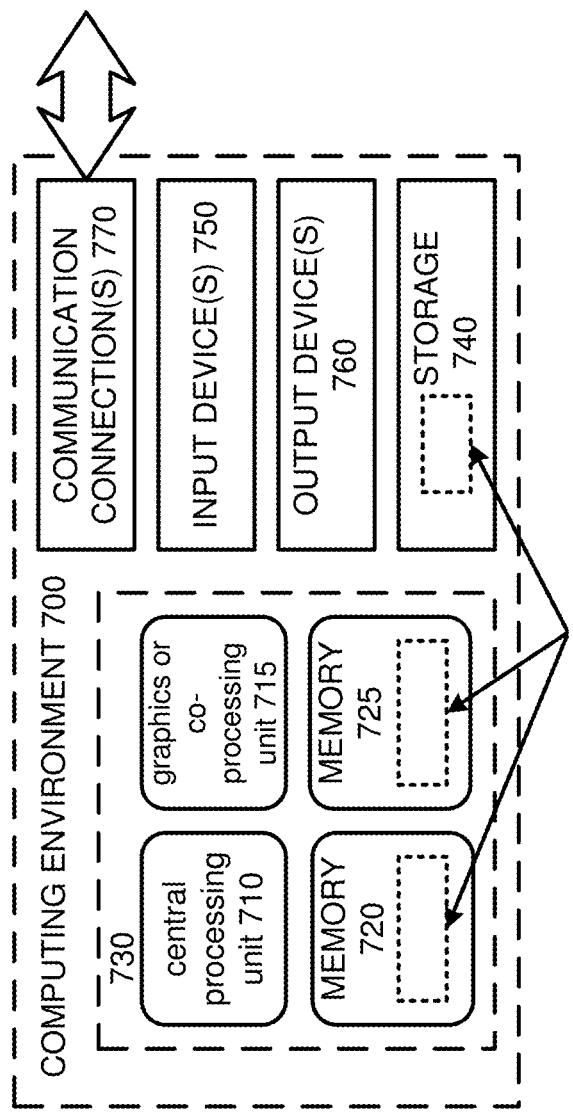
FIG. 7 is a diagram of an example computing system in which described embodiments can be implemented.

FIG. 7 depicts a generalized example of a suitable computing environment (e.g., computing system) 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.).

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein. For example, the rules engine and others described herein can be the software 780 executed from the memory 720.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although direct connection between computer systems is shown in some examples, in practice, components can be arbitrarily coupled via a network that coordinates communication.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-Programmable Gate Arrays (FPGAs), Application-Specific Integrated Circuits (ASICs), Application-Specific Standard Products (ASSPs), System-On-a-Chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

Example Cloud-Supported Environment

Figure 8:
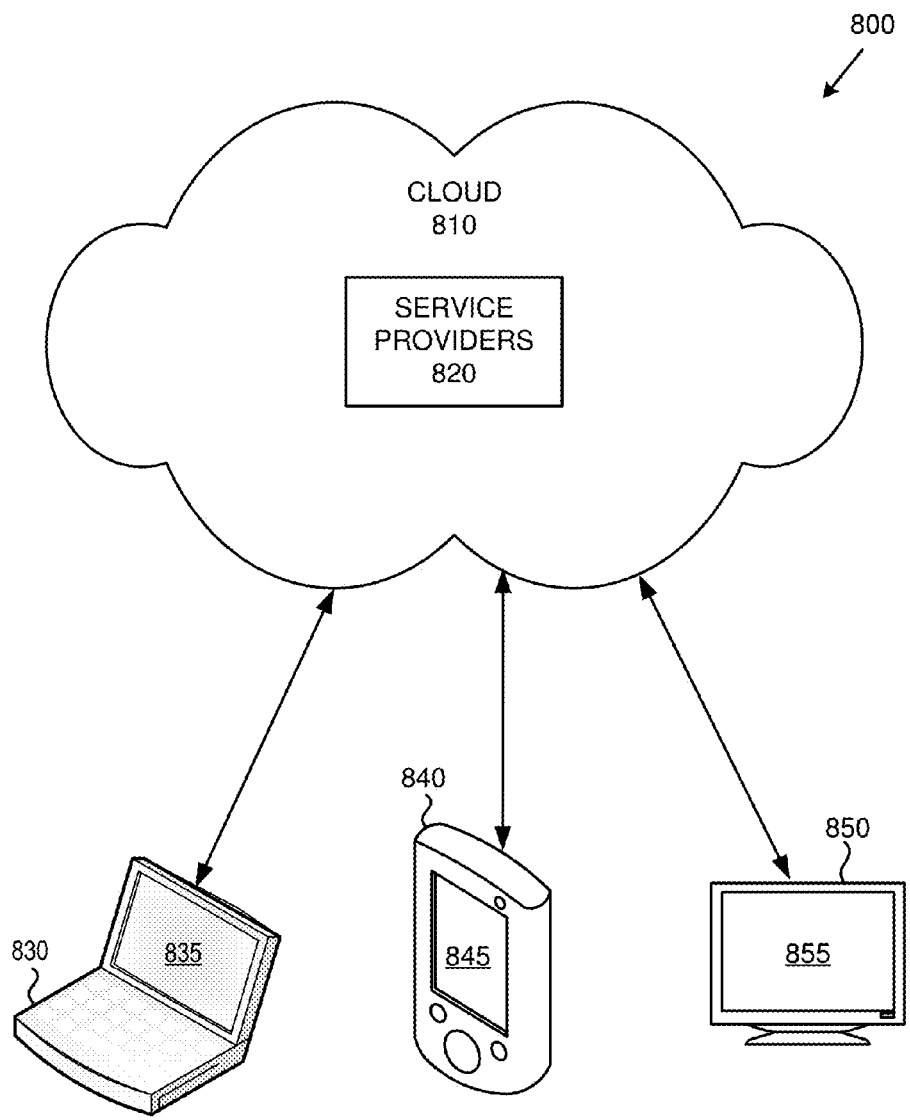
FIG. 8 is an example cloud-support environment that can be used in conjunction with the technologies described herein.

FIG. 8 is an example cloud-support environment that can be used in conjunction with the technologies described herein. In example environment 800, the cloud 810 provides services for connected devices 830, 840, 850 with a variety of screen capabilities. Connected device 830 represents a device with a computer screen 835 (e.g., a mid-size screen). For example, connected device 830 could be a personal computer such as desktop computer, laptop, notebook, netbook, or the like. Connected device 840 represents a device with a mobile device screen 845 (e.g., a small size screen). For example, connected device 840 could be a mobile phone, smart phone, personal digital assistant, tablet computer, and the like. Connected device 850 represents a device with a large screen 855. For example, connected device 850 could be a television screen (e.g., a smart television) or another device connected to a television (e.g., a set-top box or gaming console) or the like. One or more of the connected devices 830, 840, 850 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 800. For example, the cloud 810 can provide services for one or more computers (e.g., server computers) without displays.

Services can be provided by the cloud 810 through cloud service providers 820, or through other providers of online services (not depicted). For example, cloud services can be customized to the screen size, display capability, and/or touch screen capability of a particular connected device (e.g., connected devices 830, 840, 850).

In example environment 800, the cloud 810 provides the technologies and solutions described herein to the various connected devices 830, 840, 850 using, at least in part, the service providers 820. For example, the service providers 820 can provide a centralized solution for various cloud-based services. The service providers 820 can manage service subscriptions for users and/or devices (e.g., for the connected devices 830, 840, 850 and/or their respective users).

Non-Transitory Computer-Readable Media

Any of the computer-readable media herein can be non-transitory (e.g., memory, magnetic storage, optical storage, solid-state drives, or the like).

Storing in Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Methods in Computer-Readable Media

Any of the methods described herein can be implemented by computer-executable instructions in (e.g., encoded on) one or more computer-readable media (e.g., computer-readable storage media or other tangible media). Such instructions can cause a computer to perform the method. The technologies described herein can be implemented in a variety of programming languages.

Methods in Computer-Readable Storage Devices

Any of the methods described herein can be implemented by computer-executable instructions stored in one or more computer-readable storage devices (e.g., memory, magnetic storage, optical storage, solid-state drives, or the like). Such instructions can cause a computer to perform the method.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

We claim:

1. A method of controlling synchronization according to a stored update schedule, the method implemented at least in part by a computing system, the method comprising:

at a client device, locally storing a document comprising one or more visualizations based on a plurality of datasets, wherein the plurality of datasets comprise a plurality of locally stored datasets;

storing the update schedule in association with the document, the update schedule indicating a periodic interval for synchronizing the document;

selecting whether respective locally stored datasets are to be uploaded with the document to the remote server;

storing login credentials for a remote server; and programmatically uploading the document and the selected locally stored datasets from the client device to the remote server without user interaction and according to the update schedule, the uploading comprising logging into the remote server using the stored login credentials and transmitting the document to the remote server, whereby the locally stored document and the uploaded document are synchronized at periodic intervals.

2. The method of claim 1, further comprising:

determining whether a first dataset of the plurality of datasets is a remote dataset;

retrieving the first dataset from the remote server when it is determined that the first dataset is a remote dataset; and refreshing the one or more visualizations of the document based on the first dataset prior to transmitting the document to the remote server.

3. The method of claim 1, wherein a first dataset of the plurality of datasets is stored at the remote server, and the method further comprises:

downloading the first dataset after logging into the remote server according to the update schedule; and refreshing the one or more visualizations of the document based on the first dataset prior to transmitting the document to the remote server.

4. The method of claim 1, wherein the plurality of datasets comprises a first dataset and a second dataset, the first dataset being stored at the remote server, the second dataset being stored locally at the client device, and the method further comprises:
- downloading the first dataset after logging into the remote server according to the update schedule; and
- refreshing the one or more visualizations of the document based on the first dataset and the second dataset prior to transmitting the document to the remote server.

5. The method of claim 1, further comprising:
- selectively uploading at least one of the plurality of datasets to the remote server according to the update schedule and without user interaction.

6. The method of claim 1, wherein the document is shared by a group of authorized users, and the method further comprises:
- storing a contact list including the authorized users of the document; and
- transmitting a notification to respective authorized users on the contact list in response to the document being uploaded to the remote server.

7. The method of claim 6, further comprising:
- receiving a notification that the document has been uploaded to the remote server by one of the authorized users; and
- retrieving the uploaded document from the remote server and storing the uploaded document locally prior to opening the document.

8. The method of claim 1, wherein the one or more visualizations include a bar chart, a pie chart, a histogram, a donut chart, a radar chart, a timeline, or a map.

9. The method of claim 1, wherein the update schedule includes a time of day to update the document, and the periodic interval for synchronizing the document is daily, weekly, or monthly.

10. The method of claim 1, wherein uploading the document to the remote server according to the update schedule and without user interaction comprises:
- downloading a version of the document from the remote server according to the update schedule;
- determining differences between the document and the downloaded version of the document; and
- storing a record of the differences between the document and the downloaded version of the document.

11. A system comprising:
- one or more computer-readable storage media comprising:
  - a plurality of local datasets;
  - a document comprising one or more visualizations based on a plurality of datasets, wherein the plurality of datasets comprises the plurality of local datasets; and
  - an update schedule indicating a periodic interval for synchronizing the document; and
- a processor in communication with the one or more computer-readable storage media, the processor executing a client application configured to synchronize the document according to the update schedule, wherein synchronizing of the document comprises:
  - selecting whether respective local datasets are to be uploaded with the document to a remote server; and
  - in response to selecting to upload the local datasets are to be uploaded, logging into the remote server and transmitting the document and the selected local datasets to the remote server.

12. The system of claim 11, wherein synchronizing of the document further comprises:
- refreshing the one or more visualizations of the document prior to transmitting the document to the remote server.

13. The system of claim 11, wherein synchronizing of the document further comprises:
- determining that a first dataset of the plurality of datasets is a shareable local dataset; and
- based on the determining that the first dataset is a shareable local dataset, selecting the first dataset as one of the local datasets to be uploaded to the remote server.

14. The system of claim 11, wherein synchronizing of the document further comprises:
- determining whether a first dataset of the plurality of datasets is a remote dataset; and
- when it is determined the first dataset is a remote dataset, accessing the first dataset and refreshing the one or more visualizations prior to transmitting the document to the remote server.

15. The system of claim 11, wherein synchronizing of the document further comprises notifying respective users of an access list that the document has been updated.

16. The system of claim 11, wherein synchronizing of the document further comprises:
- determining whether any of the plurality of datasets have changed since the document was last refreshed; and
- when it is determined that at least one of the plurality of datasets have changed since the document was last refreshed, refreshing the one or more visualizations prior to transmitting the document to the remote server.

17. The system of claim 11, wherein synchronizing of the document further comprises:
- determining that a first dataset of the plurality of datasets is a private local dataset; and
- based on the determining that the first dataset is a private local dataset, determining that the first dataset will not be included as one of the local datasets to be uploaded to the remote server.

18. One or more computer-readable storage media comprising computer-executable instructions causing a computing system to perform a method comprising:
- at a client device, storing a document comprising a first chart generated from a private local dataset and a second chart generated from a shareable local dataset;
- storing an update schedule in association with the document, the update schedule indicating a periodic interval for synchronizing the document, wherein synchronizing the document comprises selectively refreshing the document;
- storing login credentials for a remote server;
- selecting to upload the shareable local dataset and not the private local dataset; and
- in response to selecting to upload the shareable local dataset and not the private local dataset and according to the update schedule, programmatically uploading the refreshed document and the shareable local dataset from the client device to the remote server without user interaction, the uploading comprising logging into the remote server using the stored login credentials and transmitting the document and the shareable local dataset to the remote server without uploading the private local dataset.

19. The one or more computer-readable storage media of claim 18, wherein the document comprises a third chart generated from a remote dataset, and the method further comprises downloading the remote dataset and regenerating the third chart using data from the remote dataset prior to uploading the refreshed document.

* * * * *